UNITED STATES PATENT OFFICE.

FRITZ RASCHIG, OF LUDWIGSHAFEN, GERMANY.

PROCESS OF SEPARATING META AND PARA CRESOL.

SPECIFICATION forming part of Letters Patent No. 655,117, dated July 31, 1900.

Application filed October 4, 1899. Serial No. 732,552. (No specimens.)

*To all whom it may concern:*

Be it known that I, FRITZ RASCHIG, a subject of the King of Bavaria, residing at Ludwigshafen-on-the-Rhine, Germany, have invented certain new and useful Improvements in Processes of Separating Meta-Cresol and Para-Cresol, of which the following is a specification.

As is well known, coal-tar and the phenol mixture obtained therefrom contains all the three isomeric cresols—namely, ortho, meta, and para cresol. Now, inasmuch as it is in most cases only its disinfecting property which determines the employment of cresol for technical purposes, and this property being equally possessed by all three isomers alike, the mixture was generally used without any attempt being made to separate it into its components. In view, however, of the increased use of cresol for the preparation of chemical compounds for other purposes and the necessity for obtaining these products in a pure state a separation of the cresols from each other in a pure condition suggested itself. Thus trinitro-cresol, which is obtained by first sulfonating the cresol mixture and subsequently treating it with nitric acid in a manner analogous to the preparation of picric acid from phenol, has been used as a substitute for picric acid for some time. This trinitro-cresol is a derivative of meta-cresol, the whole of the ortho and para cresol originally present in the cresol mixture becoming oxidized and completely disappearing in the process of nitration. It is obvious that this oxidation requires large quantities of nitric acid, and since the mixture of the three cresols from coal-tar is generally composed of thirty-five per cent. meta-cresol, twenty-five per cent. para-cresol, and forty per cent. ortho-cresol it will be seen that it requires three times the quantity of nitric acid to nitrate this mixture which would be necessary for converting only its percentage of meta-cresol into trinitro-meta-cresol.

In order to cut down the amount of nitric acid used, the isolation of the pure meta-cresol from the cresol mixture suggested itself. It is possible to effect the separation of the ortho-cresol, which distills at 188° centigrade, from meta and para cresol distilling at 200° centigrade by fractional distillation, thus obtaining a cresol mixture which consists of about sixty per cent. meta-cresol and forty per cent. para-cresol and the nitration of which will only require double the quantity of nitric acid corresponding to the sixty per cent. of meta-cresol present; but a process to separate the para-cresol from the meta-cresol has not been found heretofore.

By my invention, which is based upon the ready solubility of meta-cresol-sulfonic acid in sulfuric acid and the very great difficulty experienced in dissolving therein both para-cresol-sulfonic acid and its sodium salt, all these inconveniences are avoided and an easy separation of the para-cresol effected.

In carrying out my invention the commercial mixture of meta-cresol and para-cresol is heated with an amount of concentrated sulfuric acid or fuming sulfuric acid in excess of that required for the conversion of the cresols present into their respective sulfo-acids until the formation of these sulfo-acids is completed. The resulting product is then allowed to stand until the para-cresol-sulfonic acid has crystallized out, whereupon the crystals are removed from the mother-liquor. The crystals of the para-cresol-sulfonic acid are precipitated with special rapidity when after the sulfonation a small quantity of water is added to the product of the reaction. The precipitate is hydrate of para-cresol-sulfonic acid, which crystallizes in large crystals which can be readily separated by filtration from the solution.

The sodium salt of the para-cresol-sulfonic acid being, as already stated, insoluble in sulfuric acid, the para-cresol-sulfonic acid obtained in the manner described may be converted into its sodium salt by an addition of sodium sulfate or of other readily-soluble sodium salts, such as acetate and carbonate or chlorid of sodium, the sodium salt of the para-acid being likewise easily separated by crystallization. By splitting off the sulfo group by means of superheated steam in the usual manner the cresols can be obtained in a pure state from their sulfo-acids.

Example 1: For instance, for carrying the said invention into effect I may use about twenty pounds of a technical mixture of about sixty per cent. meta-cresol and forty per cent. para-cresol, which is dissolved in eighty pounds of concentrated sulfuric acid, the resulting solution being heated to 100° centigrade for one hour. It is then allowed to stand for about a week at an ordinary temperature, during which time a pasty mass of crystals will be formed, which are crystals of para-cresol-sulfonic acid, and the mother-liquor remaining consists of meta-cresol-sulfonic acid and an excess of sulfuric acid. The crystals may be separated from the liquor by filtration or by means of presses or centrifugal machines. From the crystals, as well as from the liquid, the combined sulfuric acid may be split off by superheated steam and pure para-cresol and meta-cresol obtained. In case, however, it is desired to obtain trinitro-meta-cresol this step is not necessary, the mother-liquor in this case being subjected to direct nitration. The great industrial improvement effected by this mode of operation will be apparent from the following figures: Twenty pounds of the above-named mixture of meta-cresol and para-cresol require for their perfect nitration two hundred pounds of nitric acid of 1.38 specific gravity (40° Baumé) and yield twenty pounds trinitro-meta-cresol. If, however, the para-cresol has been first separated out in the form of its sulfo-acid, there will be required only one hundred pounds of nitric acid to effect a complete nitration, with a yield of nineteen pounds of trinitro-meta-cresol. The slightly-lower yield is due to a small part of the meta-cresol-sulfonic acid adhering to the crystals of the para-acid, and thereby escaping nitration; but the cost of that one pound less in yield of the nitro product does not amount to one-tenth of the economy effected by the one hundred pounds of nitric acid saved.

Example 2: Ten kilograms of a mixture of meta and para cresol are dissolved in thirty kilograms of fuming sulfuric acid containing twenty per cent. of $SO_3$. The temperature is thereby raised up to 160° centigrade and the sulfonation takes place quickly and without any heating. The solution is then cooled and mixed under continuous cooling with ten liters of water, so that the temperature does not exceed 50° centigrade. The mixture solidifies completely within twenty-four hours and is then treated in the same manner as in Example 1.

Example 3: Twenty pounds of the same mixture of meta-cresol and para-cresol, as in Example 1, are dissolved in fifty pounds concentrated sulfuric acid and heated to 100° centigrade for one hour. A warm solution of eight pounds anhydrous sodium sulfate in forty pounds water is then added, and after being thoroughly mixed the whole is set aside until perfectly cool. The resultant paste of crystals consists of crystals of the sodium salt of the para-cresol-sulfonic acid, and the mother-liquor consists of meta-cresol-sulfonic acid and sulfuric acid with small quantities of the sodium sulfate added in excess. The crystals and liquor are then separated, and the latter may be either subjected to direct nitration or may be changed into meta-cresol by the action of steam.

Though I prefer to use the several ingredients in the proportions enumerated in the above instances of operation, still it is obvious that these may be varied to some extent without deviating from the spirit of my invention so as to suit existing conditions. Thus the amount of sulfuric acid used in the first example may be decreased, especially in the winter, when it is possible to cool the solution below the ordinary temperature.

Having thus described my invention, I claim as new and desire to secure by Letters Patent—

1. The herein-described process for the separation of meta-cresol and para-cresol, which consists in first converting them into sulfo-acids and subsequently separating the solid para-acid from the liquid meta-acid, substantially as set forth.

2. The herein-described process for the separation of meta-cresol and para-cresol, which consists in first converting them into their respective sulfo-acids, separating the solid para-acid from the liquid meta-acid, and finally treating each sulfo-acid with steam for recovering the cresol therefrom, substantially as set forth.

In testimony that I claim the foregoing as my invention I have signed my name in presence of two subscribing witnesses.

FRITZ RASCHIG.

Witnesses:
FR. JOSEF DÖRFEL,
LUDWIG BURKARD.